Jan. 29, 1957 J. K. HODDEVIK 2,779,049
RETRACTABLE CASTER
Filed April 14, 1953 2 Sheets-Sheet 1

INVENTOR.
Jonas K. Hoddevik
BY
Barnes + Seed
attys.

Jan. 29, 1957  J. K. HODDEVIK  2,779,049
RETRACTABLE CASTER
Filed April 14, 1953  2 Sheets-Sheet 2

*INVENTOR.*
Jonas K. Hoddevik
BY
*Barnett & Seed*
*atty's.*

United States Patent Office 2,779,049
Patented Jan. 29, 1957

2,779,049
RETRACTABLE CASTER

Jonas K. Hoddevik, Seattle, Wash.

Application April 14, 1953, Serial No. 348,624

5 Claims. (Cl. 16—34)

The invention relates to casters and more particularly to casters that are mounted so they may be conveniently retracted.

The purpose of the invention is to provide a substantially retractable caster for attachment to a movable item which periodically rests upon other supporting means that are non-rotatable.

The invention, briefly described, comprises a caster fitted to a channel with upright slotted legs, a complementary frame about the channel, a cross-shaft anchored to the frame and passing through the slots of the legs, and a locking flange member secured to the channel to lock the channel to the frame when the caster is under load so as to keep the caster in its operating position.

The invention will be more clearly understood as the following detailed description is read in conjunction with the accompanying drawings wherein the same parts are identified by like numerals throughout the figures.

Figure 2:
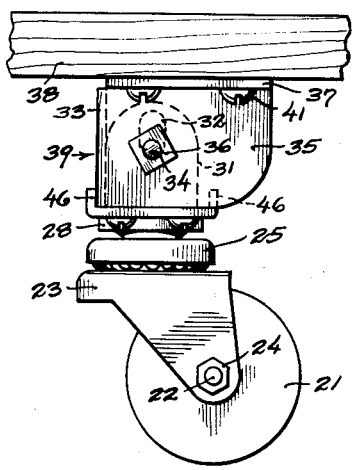
Fig. 2 is a side elevational view of said caster and mounting, and incorporating a showing of a plate to which the mounting is attached.
Figures 8, 11:
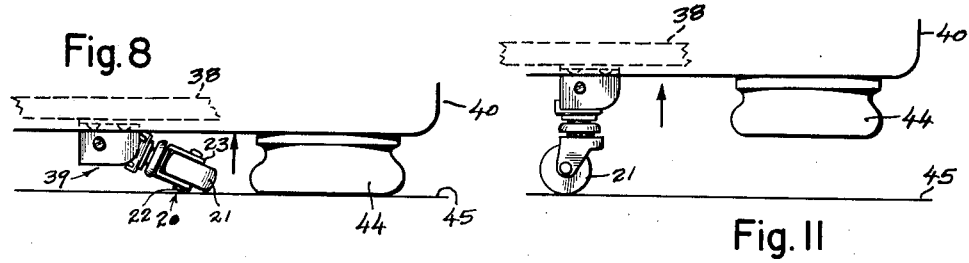
Figures 9, 12:
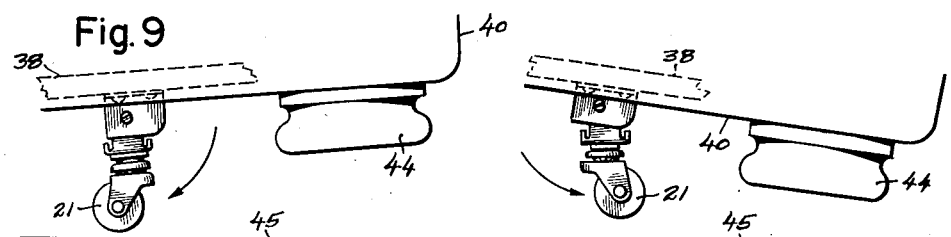
Figures 10, 13:
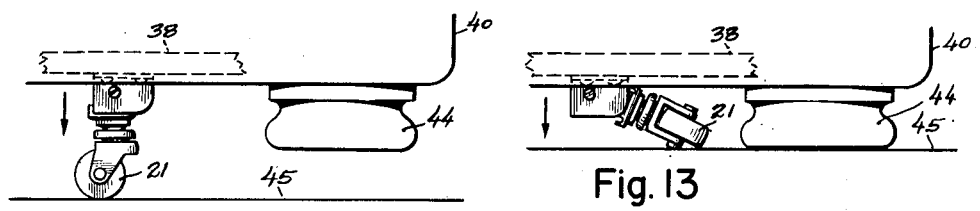

Figs. 8 through 13 are elevational views of a caster mounting and plate combination of the nature portrayed in Fig. 2, shown attached to a davenport, and illustrating various positions which the caster assumes. Fig. 8, in more particularity, shows the caster in an inoperative position, the davenport resting upon its own legs but showing by the arrow the act of initiating a lifting of the davenport preliminary to setting the same upon the casters. Fig. 9 indicates the davenport as having been lifted off the floor and tilted in such a direction as causes the caster to swing by gravity into such a position as locates its vertical axis at substantial right angles to a plane common to the bearing surfaces of the several legs of the davenport. Fig. 10 shows the davenport as having been again lowered, and with the caster now bearing upon the floor so as to take the load. Fig. 11 is a view similar to Fig. 10 but here showing by the arrow the act of initiating a lifting of the davenport preliminary to again resting the same upon its own legs. Fig. 12 shows the davenport lifted off the floor and again tilted, this time in the direction opposite that shown in Fig. 9, so that the caster will swing by gravity into a pendant position and initiate that which is tantamount to a jack-knifing action. Fig. 13 is a view similar to Fig. 8 with the davenport having been lowered so as to rest upon its own legs, and with the caster occupying a jack-knifed inoperative position.

More particularly and in reference to these figures, the invention comprises the caster unit 20 consisting of the wheel 21, the axle 22, the axle-supporting yoke 23, the axle-securing nuts 24 and the yoke-receiving socket and bearing member 25; the bearing support unit 26 integrally secured to the bearing member 25 consisting of a flanged locking plate 27 and a channel 28 secured to the plate 27 by the bolt-nut fasteners 30, the legs 31, 31 of the channel 28 being upright and slotted 32, 32 in a direction perpendicular to the locking plate 27; and a frame unit 39 consisting of a three-sided body 33 that interlocks with the flanged plate 27 and receives the channel legs 31, 31 which are connected to it by the connecting pin 34 which is passed through the slots 32, 32 of the legs 31, 31 and the body sides 35, 35 and secured by the nuts 36, 36, the body flanges 37, 37 providing a place of attachment when mounting the entire caster wheel assembly to the frame members 38, 38 of a davenport 40 or other item (not shown) using fasteners 41 passed through the holes 42 in the body flanges 37, 37.

Figure 3:
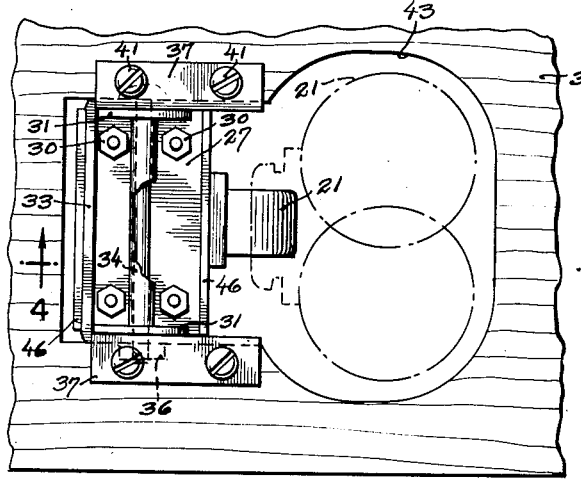
Fig. 3 is a fragmentary top plan view of the caster and mounting, and shown attached to a modified form of plate distinguished from the plate of Fig. 2 in that the same provides a recess into which the caster is received when the latter is retracted, dotted lines in this view showing the caster when so retracted, after giving the same a half-turn either to the right or to the left.
Figure 4:
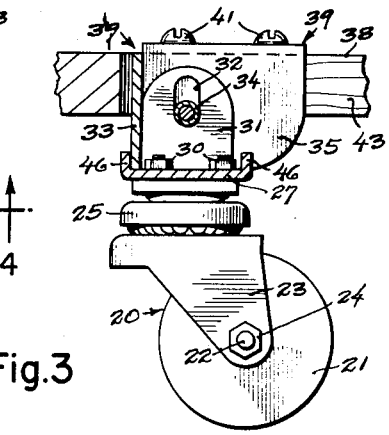
Fig. 4 is a longitudinal vertical sectional view on line 4—4 of Fig. 3.
Figure 5:
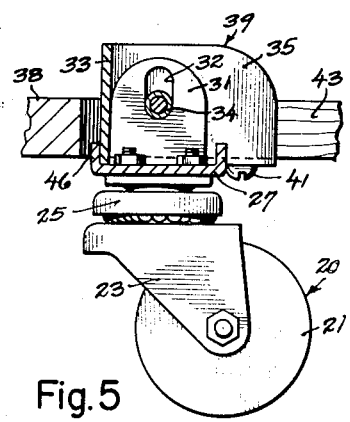
Fig. 5 is a sectional view similar to Fig. 4 illustrating a modified manner of connecting the caster mounting to a recessed frame-piece.
Figure 6:
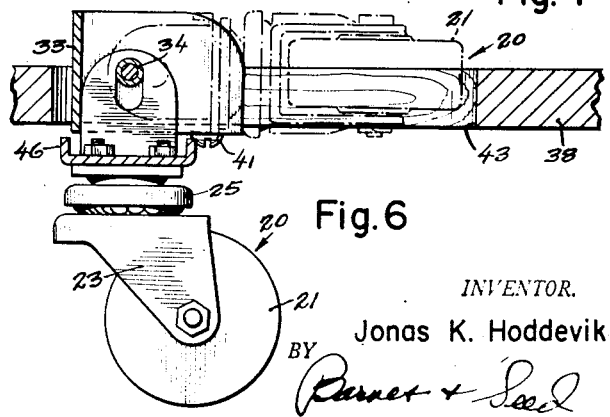
Fig. 6 is a sectional view similar to Fig. 5 showing the caster in the position which the same assumes when relieved of a load, and employing dotted lines to illustrate the caster in a retracted position.

The manner and place of attachment of the caster units can be varied, for example, in Fig. 2 the frame unit 39 is entirely below the frame member 38 of the davenport 40. This mounting requires that the body flanges 37, 37 be located at the top of the body 33 as shown in Figs. 1, 2, and 7 through 13. Also this same arrangement is illustrated in Figs. 3 and 4 where the frame member 38 of the davenport 40 has been cut away to provide a recess 43 so shaped as to receive the retracted caster wheel 21 regardless of what rotative position it has assumed. In Figs. 5 and 6, however, the body-flange arrangement is different. The flange 37 here extends from the lower portion of the body 33. In this way after the frame unit 32 is inserted within the recess 43, the fasteners are accessible from beneath the davenport 40 in contrast to the arrangement of Figs. 3 and 4. However, with the flanges 37, 37 at the lower portion of the body 33 the frame unit 32 is no longer suitable for mounting as illustrated in Fig. 2.

Figure 1:
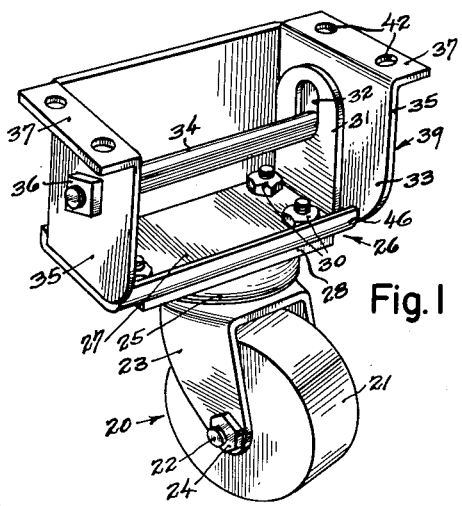
Figure 1 is a perspective view of a caster and mounting constructed to embody the preferred teachings of the present invention and with the caster shown in the position which the same assumes when it is taking a load.

Other ways of arranging these components are contemplated, such as turning the flanges in the opposite sense from the direction shown in Fig. 1. Moreover, the box-type design could be modified by the incorporation of semi-circular parts. However, the illustrations are considered to represent the most simplified and economical design that embodies the concepts of the invention.

Figure 7:
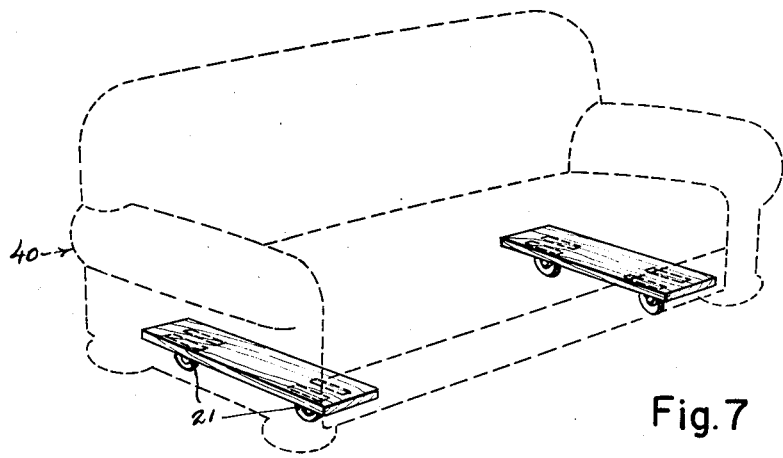
Fig. 7 is a somewhat schematic perspective view showing the positions, upon the underside of a davenport, in which the plates which carry the caster mountings are customarily placed, the davenport being portrayed by dotted lines and the plates and casters being shown by full lines.

The operation remains the same for all the installations. Figs. 8 through 13 cover the entire cycle of the use of the retractable caster. In Fig. 8, the davenport of Fig. 7 is resting on its legs 44 and the caster unit 20 with its associated bearing support unit 26 has been rotated with respect to the frame unit 32 into the retracted position.

Starting from this position, the load is transferred from the legs 44 to the caster wheels 21 by first raising one end of the davenport higher than the other end, as shown in Fig. 9. This can be performed by two persons or, if desired, one person can perform the necessary tilting action by raising one end while allowing the other end to rest upon the floor. It is perforce necessary, when a single person is performing the operation, that the davenport be given a greater degree of tilt than would otherwise be the case, so that both casters are elevated off the floor. The illustration of Fig. 9 is deceptive in this particular in that the non-illustrated caster would self-evidently not clear the floor until the illustrated caster were raised considerably higher than here shown. The caster and bearing support units, 20 and 26, respectively, pivot and drop until checked as the connecting pin 34 is stopped by the bottom of the slots 32, 32. Thereafter the davenport 40 is lowered so the wheel 21 contacts the floor 45 and immediately the connecting pin 34 moves in the opposite direction until stopped by the top of the slots 32, 32. At this instant the davenport load is transferred to the wheels 21.

The permanence of this transfer, for as long a time as the load remains, is assured by the locking feature wherein the flange 46 of the flanged locking plate 27 closely overlaps the back wall of the body 33. In this manner retractable rotation of the caster unit 20 is prevented during the entire time the davenport is rollably supported on the wheels 21 in the position shown in Fig. 10.

To return the davenport to its non-movable state, the lifting movements are somewhat reversed. As shown in Figs. 11 and 12 an upward lift is soon converted into one favoring an opposite tilting position of the davenport in contrast to that shown in Fig. 9. In this way the locking flange 46 drops below said back wall of the body 33 as the connecting pin 34 travels to the bottom of the slots 32, 32 and immediately thereafter the tilting causes retraction of the wheel 21. By maintaining the angularity of the davenport 40 during its overall lowering the wheels are kept in their retracted positions and the load of the davenport 40 is once again carried by the supporting solid legs 44.

Where this type of transfer of the load from movable to non-movable supports is desired, the invention as illustrated and described in connection with a davenport will be found to be equally suitable for use in conjunction with other types of furniture as well as for use on commercial equipment such as part bins in factories or shipping containers in warehouses and many other similar adaptations.

It is thought that my improved retractable caster and the manner of its working will have been clearly understood from the foregoing detailed description. It is my intention that no limitations be implied and that the hereto annexed claims be given the broadest interpretation to which the employed language fairly admits.

What I claim is:

1. A retractable caster unit comprising, in combination: a box-like frame having means for securing the same to the bottom of a davenport or other like piece and formed to provide a pocket open at the bottom and walled along two sides and the back, a U-shaped caster mounting having its two legs received in said pocket so as to each closely overlie a related one of the two side walls and each provided with a vertical slot, a rod fixed to and extending horizontally between said side walls and passing through the slots of said legs for connecting the caster mounting to the frame in a manner permitting the mounting to move vertically within limits imposed by the two ends of the slots and to also swing forwardly about the center of the rod as a pivot, and a caster swivel-mounted from the underside of the cross-arm of said U-shaped caster mounting, means being provided acting automatically to lock the caster mounting against said forward swinging movement when the mounting lies at the upper limit of its permitted vertical motion.

2. Structure according to claim 1 in which the means last recited comprises a plate fixed to the cross-arm of the caster mounting and presenting an upstanding lip along the back edge, said lip catching behind the back wall of the frame when the caster mounting is moved to the upper limit of its permitted vertical motion.

3. Structure according to claim 1 in which the means for securing the frame to the davenport comprises outturned flanges provided by the side walls of the frame along a horizontal edge thereof.

4. Structure according to claim 1 in which the frame admits of being secured to the davenport so that the back wall lies at either one or the other side of the rod, selectively, and wherein the locking means comprises a plate fixed to the cross-arm of the caster-mounting and presenting an upstanding lip along both the front and the back edge, one or the other of said lips, depending upon the selective mounting of the frame, catching behind the back wall of the frame when the caster mounting is moved to the upper limit of its permitted vertical motion.

5. A retractable caster unit comprising, in combination: a plate arranged to be secured to the bottom of a davenport or other like piece, a box-like frame secured to said plate formed to provide a pocket open at the bottom and walled along two sides and the back, a U-shaped caster mounting having its two legs received in said pocket so as to each closely overlie a related one of the two side walls and each provided with a vertical slot, a rod fixed to and extending horizontally between said side walls and passing through the slots of said legs for connecting the caster mounting to the frame in a manner permitting the mounting to move vertically within limits imposed by the two ends of the slots and to also swing forwardly about the center of the rod as a pivot, and a caster swivel-mounted from the underside of the cross-arm of said U-shaped caster mounting, means being provided acting automatically to lock the caster mounting against said forward swinging movement when the mounting lies at the upper limit of its permitted vertical motion, said plate providing a recess formed to accommodate the caster as the latter swings forwardly about the center of the rod as an axis.

References Cited in the file of this patent

UNITED STATES PATENTS

| 350,333 | White | Oct. 5, 1886 |
| 763,214 | Smith | June 21, 1904 |
| 894,949 | Hendricks | Aug. 4, 1908 |
| 953,492 | Sharon | Mar. 29, 1910 |
| 1,014,440 | Benskin | Jan. 9, 1912 |
| 1,482,946 | Serva et al. | Feb. 5, 1924 |
| 2,254,088 | Peterson | Aug. 26, 1941 |
| 2,490,953 | Eriksen | Dec. 13, 1949 |

FOREIGN PATENTS

| 184,840 | Switzerland | Feb. 1, 1937 |